Feb. 16, 1971     H. S. RUEKBERG     3,564,087
EXTRUSION OF PLASTIC TUBING WITH CONTROLLED VARIABLE DIAMETER
Filed June 7, 1968     3 Sheets-Sheet 1
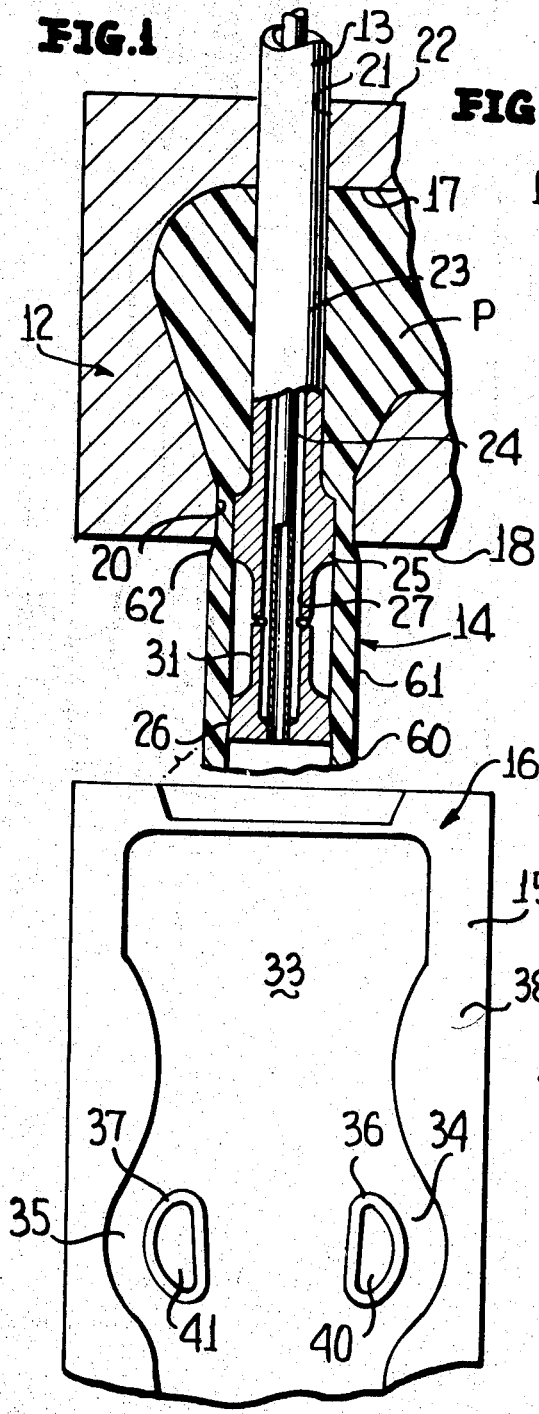
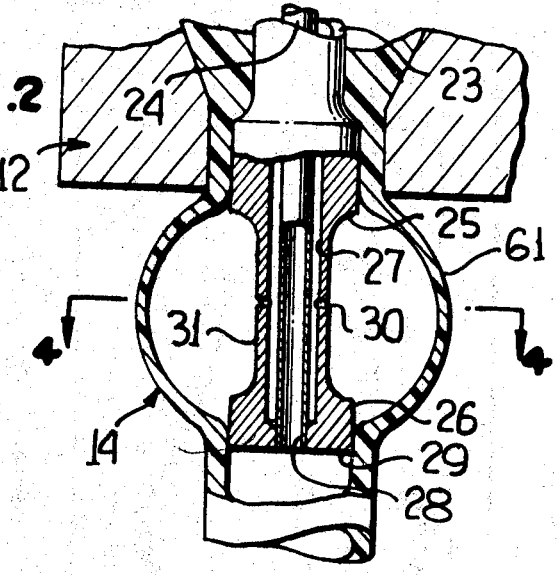
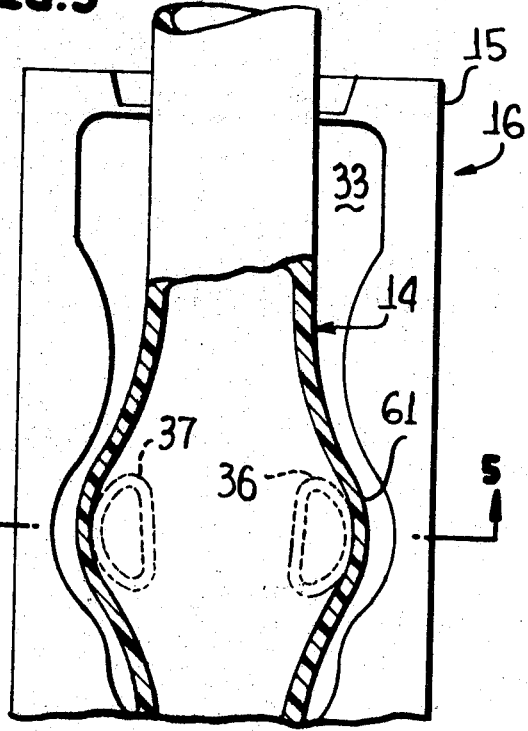
INVENTOR
HERBERT S. RUEKBERG
BY Mason, Porter, Diller & Brown
ATTORNEYS

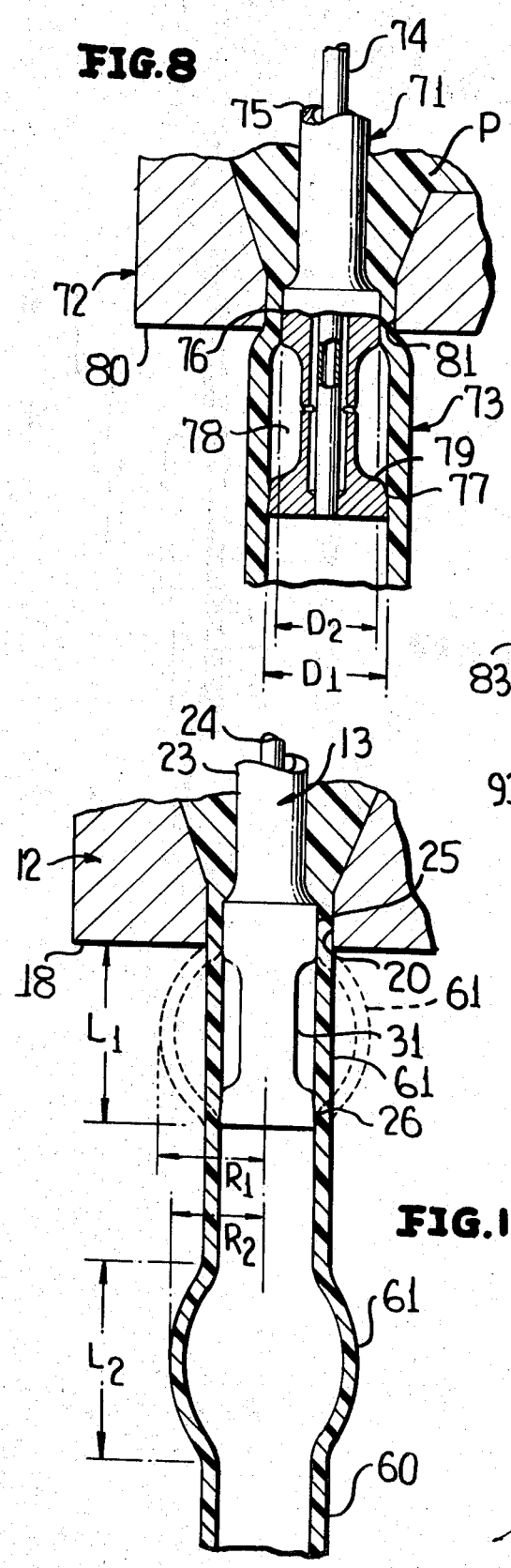
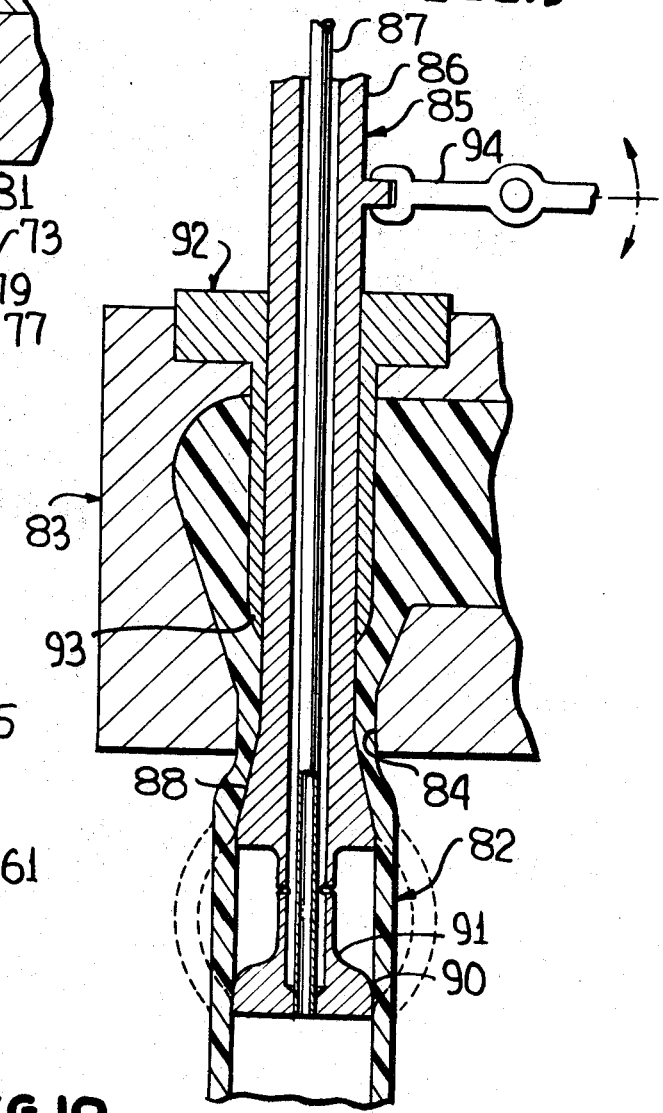

United States Patent Office 3,564,087
Patented Feb. 16, 1971

3,564,087
EXTRUSION OF PLASTIC TUBING WITH CONTROLLED VARIABLE DIAMETER
Herbert S. Ruekberg, Highland Park, Ill., assignor to Continental Can Company, Inc., New York, N.Y., a corporation of New York
Filed June 7, 1968, Ser. No. 735,417
Int. Cl. B29c 17/07, 23/00
U.S. Cl. 264—89                    24 Claims

ABSTRACT OF THE DISCLOSURE

This disclosure relates to the extrusion of plastic tubing having localized variations in diameter, due to the introduction of variable fluid pressure inside the tubing, and the subsequent blow-molding of the localized variable diameter extrusion to form a bottle having integral hollow handles which are free of flash exteriorly of a mold handle parting line.

---

In blow-molding bottles without handles, the parison is generally of a relatively small diameter compared to the diameter of the final bottle. However, in blow-molding bottles with handles it has been necessary to use a parison of a large diameter because it has been necessary to place the extruded parison in a mold such that part of the parison extended outside of that portion of the mold cavity responsible for handle pinch-off when the mold was closed. Such a procedure necessarily established the width of the extruded parison. Thus, in any section of a bottle mold cavity which is of less diameter than this established width, the parison is larger than the mold cavity and is pinched off by the mold, leaving flash along the parting line of the bottle. Such a procedure is particularly undesirable in that it requires a trimming operation which necessitates excessive handling and resultant increased costs during the manufacturing process.

A further disadvantage of prior art extrusion blow-molding techniques was that, once the flash had been removed from the bottle, the resultant trimmed surface was unsightly and unappealing to customers from an aesthetic standpoint.

In the extrusion of plastic tubing, it is conventional to introduce air into the parison or tube at atmospheric pressure or slightly above in order to keep the parison from collapsing. By varying the air pressure through the same duct, it would affect the entire length of extruded parison and would cause some ballooning out of the softest walls, but very little control could be obtained as to the location or size of the ballooning.

The present invention obviates the disadvantages of prior extrusion blow-molding techniques by increasing the diameter of a localized portion of the extruded parison by using variable air pressure. The desired size of the localized portion can be controlled by a predetermined value of air pressure applied to the localized portion.

The present invention thus utilizes a plurality of concentric tubes within an extended core pin, the inner tube of which supplies low pressure air for preventing the parison from collapsing, and the outer tube of which supplies variable pressure air for maintaining close control on the ballooning-out of the parison to yield a desired configuration of the parison.

Accordingly, it is a primary object of this invention to provide a novel method and apparatus for extrusion blow-molding articles by increasing the diameter of a localized portion of an extruded parison prior to closing the mold on the parison.

It is another object of this invention to provide a novel method and apparatus for extrusion blow-molding whereby a localized portion of a tubular extruded parison is subjected to variable fluid pressure, while a remaining portion of the parison is subjected to low fluid pressure, in order that a desired configuration of the localized portion of the parison may be obtained prior to placement of the parison within a mold cavity.

It is still another object of the present invention to provide a novel method and apparatus whereby a core pin extends beyond the face of the extrusion die, and concentric distribution tubes extend through the core pin for supplying low pressure air for preventing the collapse of the parison, and variable pressure air for facilitating the expansion of a localized portion of the parison.

It is still further an object of this invention to provide a parison of predetermined configuration for insertion into a split mold cavity, to facilitate the construction of molded articles having handles integral therewith, the handles being free of flash resulting from the split mold parting line.

It is yet another object of the present invention to provide a novel method and apparatus for facilitating the blow-molding of substantially large diameter articles from small diameter extruded parisons, wherein portions of the parisons are "pinched-off" to facilitate the formation of integral hollow handles of the articles with the handles being free of flash adjacent the split mold parting line.

It is yet another object of the present invention to provide a novel method and apparatus for facilitating the extrusion blow-molding of articles by increasing a localized portion of an extruded parison by means of variable air pressure while varying the wall thickness of the extruded parison by means of core pin displacement.

With the above and other objects in view that will hereinafter appear, the nature of the invention will be more clearly understood by reference to the following description, the appended claims, and the several views illustrated in the accompanying drawings.

In the drawings:

FIG. 1 is a fragmentary sectional and elevational view of an extrusion blow-molding apparatus of this invention, and illustrates the tubular configuration of an extruded parison prior to the application of variable air pressure to the parison for increasing the diameter of a localized portion thereof.

FIG. 2 is a fragmentary vertical sectional view of an extruded parison of this invention with concentric air distributoin tubes of a core pin being shown in detail, and illustrates a portion of the parison in its "ballooned-out" configuration.

FIG. 3 is a fragmentary elevational view with portions shown in section, and illustrates the "ballooned-out" portion, which is slightly elongated, being positioned within one-half of a blow-mold cavity during the closing of a mating half of the blow-mold cavity.

FIG. 8 is a fragmentary vertical sectional view of an extrusion die and core pin of this invention, and illustrates a core lip of greater diameter than that portion of the core pin within the die, the enlarged core lip being adapted to form an effective pressure barrier between those volumes within the parison which are subjected to different fluid pressures.

FIG. 9 is a fragmentary vertical sectional view through another extrusion die and core pin of this invention, and illustrates an adjustable core pin adapted to form a parison wall of variable wall thickness and of variable diameter, the manner of adjustment of the core pin in a longitudinal direction being illustrated by means of linkage.

FIG. 10 is a fragmentary vertical sectional view through another extrusion die and core pin of this invention, and illustrates the extrusion of a relatively soft plastic parison adapted to result in an elongation of the ballooned-out portion.

Figure 5:
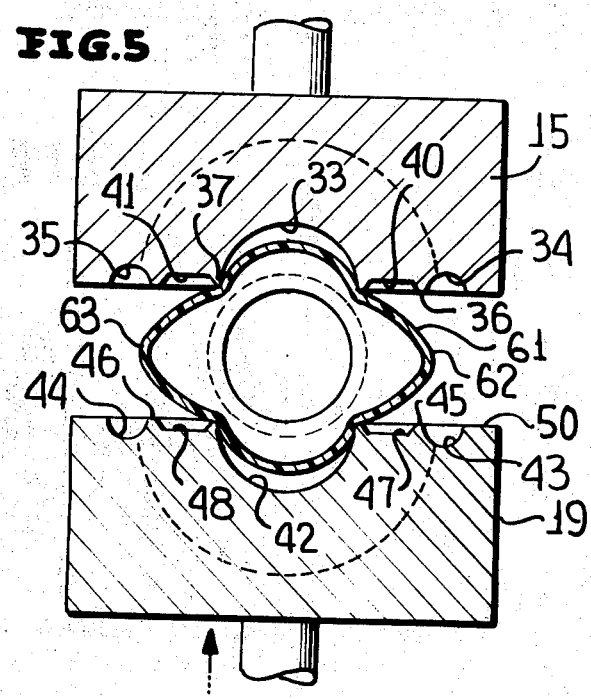
FIG. 5 is a transverse sectional view taken along the line 5—5 of FIG. 3, and illustrates one of the cooperating split mold halves in contacting engagement with the elongated "ballooned-out" parison portion during the closing operation of that mold half while the parison lies within the mating mold half.

Referring now to the drawings in detail, reference is first made to FIG. 1 wherein there is illustrated an extrusion die shell 12, a die core pin 13, a generally tubular plastic parison 14, and one mold half 15 of a split blow-mold 16.

The extrusion die shell 12 has an enlarged interior cavity 17, terminating adjacent an extrusion die face 18 in a bore 20. Another bore 21 is shown extending through an opposite face 22 of the extrusion die from that of die face 18, the bore 21 being in substantial alignment with the bore 20.

The core pin 13 comprises a substantially hollow outer tube 23 having a concentrically disposed inner tube 24 therein. The outer tube 23 has an annular cylindrical core portion 25 and an annular lip 26 in predetermined spaced relation to the core portion 25. An inner bore 27 of the outer tube 23 extends longitudinally of the outer tube 23, and terminates adjacent an end surface 29 within the annular lip 26 to form an inner annular seal 28 with an adjacent end of the inner tube 24. Between the core portion 25 and the annular lip 26 are a plurality of ports 30 which extend transversely of a longitudinal axis of the outer tube 23, and open outwardly from the bore 27 into an outer annular recess 31 formed in the outer surface of the outer tube 23 between the core portion 25 and the annular lip 26 of the core pin 13. The inner tube 24 is a hollow member extending throughout the length of the core pin 13, and terminates adjacent the surface 29 in air-tight relation within the seal forming end 28 of the outer tube 23.

The lip 26 co-acts with the inside wall of the extruded parison 14 to keep that section of the parison 14 adjacent the lip 26 in close proximity with the lip 26, thereby preventing the escape of a substantial amount of pressurized air from the recess 31 past the lip 26 during the "ballooning" operation as will hereafter be described.

The mold half 15 of the split mold 16 includes a major body cavity 33 and handle cavity portions 34, 35 communicating with the major body cavity 33 at upper and lower ends of the cavity handle portions. The cavity handle portions 34, 35 are partially separated from the major cavity portion 33 by respective peripheral lands 36, 37 which extend outwardly of the cavity 33 into the plane of a surface 38 of the mold half 15 which defines the mold parting line. Recesses 40, 41 are provided inside each of the respective lands 36, 37. The lands 36, 37 are adapted to provide a handle "pinch-off" and the recesses 40, 41 are adapted to receive therein any material which is "pinched-off" by the respective lands 36, 37.

Another mold half 19 of the split mold 16 is illustrated in FIG. 5 as being movable in the direction of the arrow of FIG. 5 toward the other mold half 15. The mold half 19 includes a major body cavity portion 42, handle cavity portions 43 and 44, peripheral lands 45, 46 and recesses 47, 48 within the respective lands 45, 46, similar to the mold half 15. Each of the cavity portions and lands of the mold half 19 is positioned opposite aligned cavity portions and lands of the mold half 15, in the manner illustrated in FIG. 5.

Figure 6:
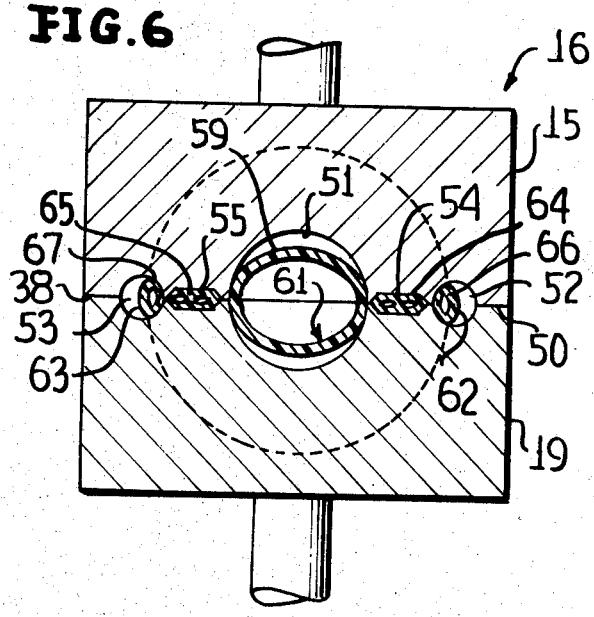
FIG. 6 is a transverse sectional view of the parison and split mold of this invention, taken along a line similar to that of 5—5 of FIG. 3, and illustrates the mold halves in engagement with each other with portions of the mold halves defining "pinched-out" portions of the parison prior to blowing the bottle and handles to fill their respective cavities.

In FIG. 6 there is illustrated the mold 16 with the mold halves 15, 19 in the closed position thereof, wherein the surface 38 of the mold half 15 and a surface 50 of the mold half 19 are positioned in adjacent abutting relation defining therebetween the mold parting line. In this position the major body cavity portions 33 and 42 of the respective mold halves 15 and 19 cooperate to form a complete body cavity 51. Similarly, the handle cavity halves 34, 43 and 35, 44 cooperate to form complete handle cavities 52, 53, respectively. Also, recesses 40, 47 and 41, 48 cooperate to form enclosed recess portions 54, 55, respectively.

Figure 7:
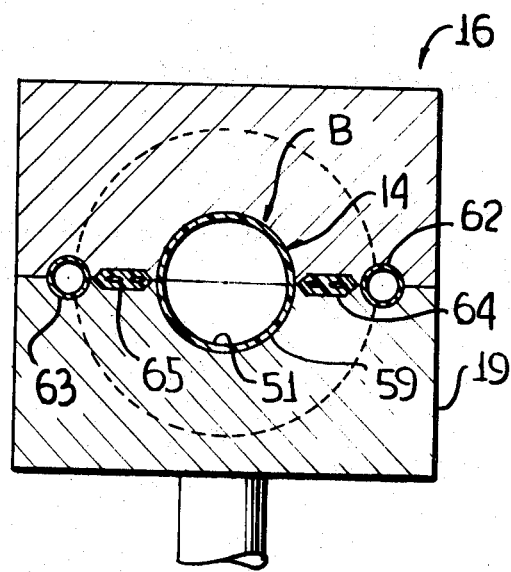
FIG. 7 is a transverse sectional view through the mold and completely formed bottle of this invention, taken along a line similar to the line 5—5 of FIG. 3, and illustrates the bottle and handles being shown in their fully expanded, blow-molded condition, conforming to the shape of the mold cavity.

In FIG. 7 there is illustrated the closed mold 16 having a needle 56 extending through the mold half 15 into cavity 51, and attached to the mold half 15 by means of a fitting 57 secured within the mold half 15. An air supply line 58 is attached to the fitting 57 for supplying air inwardly of the parison 14 to expand the parison and fill the mold.

The cavity 17 of the extrusion die 12 contains plastic material P such as polyethylene, polyvinylchloride or the like, under pressure. The plastic material P surrounds the core pin 13 and is forced out through the bore 20 adjacent the die face 18 of the extrusion die shell 12, and surrounds the core portion 25 of the die core pin 13. The plastic material P is thus extruded into the generally cylindrical form of the tubular plastic parison 14 as illustrated in FIG. 1. The parison 14 is defined by a first parison portion 60 extending beyond the annular lip 26 of the core pin 13, and a second parison portion 61 between the annular lip 26 and the core portion 25. The parison 14 may expand radially somewhat upon leaving the die, as pressure is released from the material, in that portion of the parison 14 adjacent the die face 18, as illustrated by the numeral 62 in FIG. 1.

A fluid such as air, either at atmospheric pressure or at a relatively low pressure slightly above atmospheric, is distributed through the inner tube 24 into the interior of the first parison portion 60 in order to prevent the first parison portion 60 from collapsing, following the movement of the first parison portion 60 over the annular lip 26 of the core pin 13. The seal 28 between the inner tube 24 and outer tube 23 prevents the distribution of the low pressure air from within the inner tube 24 into that volume defined by the outer surface of the inner tube 24 and the bore 27 of the outer tube 23.

Air or other fluid, at atmospheric pressure or slightly above, is distributed through the bore 27 of the outer tube 23 and through the ports 30 into the volume defined by the annular recess 31 and the inner surface of the second parison portion 61, in order to keep the parison portion 61 from collapsing onto the extended portion of the core pin 13.

As the parison 14 continuously moves over the core pin or mandrel 13 toward the mold 16, the air pressure within the second parison portion 61 is rapidly increased a predetermined amount and for a predetermined "pulse" or a length of time. This can be accomplished by momentarily increasing the air pressure introduced into the bore 27 by conventional means, such as by further opening a valve (not shown) in a line connected to the bore 27.

This rapid increase in pressure causes the second portion 61 of the parison 14 to enlarge in diameter or to "balloon" over a length of the core pin 13 defined between core portion 25 and lip 26. The particular configuration of the "ballooned" portion 61 of the parison 14 is generally spherical, but may have an oval shape, depending upon the viscosity of the plastic P, the speed of movement of the parison 14 over the core pin 13, and the length of the pressurized air "pulse." The parison 14 then continues its movement along the core pin 13, away from the die 12 until the "ballooned" second parison portion 61 has completely traveled past the lip 26 of the core pin 13, as illustrated in FIG. 10. During this movement of the parison 14 beyond the core pin 13, the ballooned second parison portion 61 will undergo a change in configuration from the generally spherical shape illustrated in FIG. 2 and in phantom in FIG. 10 to the generally oval shape, as illustrated in FIG. 10. This change in shape of the second parison portion 61 is due to the weight of the parison itself, which tends to elongate the "ballooned" portion of the parison 14 to an oval configuration. During this elongation of the ballooned parison portion 61, the original length $L_1$ of the ballooned portion would elongate to a length represented by the length $L_2$ in FIG. 10, concurrently with a decrease in radius of the ballooned parison portion from an original radius represented by $R_1$ to radius $R_2$, after elongation has taken place.

Figure 4:
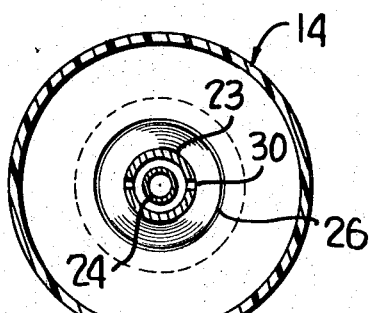
FIG. 4 is a transverse sectional view taken along the line 4—4 of FIG. 2, and illustrates the "ballooned-out" portion of the extruded parison and the concentric air distribution tubes.

During this elongation of the ballooned parison portion 61, the parison decreases in transverse diameter from that illustrated in FIG. 4, in the manner heretofore described, to a smaller transverse diameter (not shown), during which time the parison 14 has lined up with mold halves 15, 19 of the mold 16, during its continuous longitudinal movement. The second parison portion 61, in the somewhat elongated "ballooned" condition thereof occupies a position between the mold halves 15, 19 having portions disposed adjacent the handle-forming cavity portions 34, 35, 43 and 44.

The mold halves 15 and 19 are then moved together, and those portions of the lands 36, 37, 45 and 46 which are immediately adjacent respective major body cavity portions 33 and 42 contact the outer surface of the elongated "ballooned" second parison portion 61 of the parison 14, thereby tending to elongate the parison in transverse section, as is illustrated in FIG. 5, from a generally circular section to a somewhat oval section, whereby opposite sides 62, 63 of the parison portion 61 are moved outwardly from each other. During the continuous movement of one mold half 19 toward the other mold half 15, the side 62 of the parison portion 61 moves outwardly of the major body cavity portions 33 and 42, past the outermost portions of the adjacent lands 36 and 45 to a position where the side 62 of the parison portion 61 is engaged between the outermost portions of lands 36 and 45 with the side portion 62 confined within the handle-forming cavity portions 34 and 43. Simultaneously therewith, the side 63 of the parison portion 61 is "pinched-off" outwardly of the outermost portion of the lands 37 and 46, and lies within the handle-forming cavity portions 35 and 44, in the manner illustrated in FIGS. 5 and 6. During this "pinching-off" operation of the lands, the "pinched-off" material 64, 65 is received within the recesses 40, 47, and 41, 48 defined by the abutting mold halves 15 and 19.

During the "pinching-off" operation the sides 62, 63 of the parison portion 61 are spaced sufficiently outwardly of the lands to entrap air within respective voids 66, 67, communicating with the inside volume 68 of the parison portion 61, but positioned outwardly of the void 68, within the handle-forming cavities 52, 53.

The ballooned portion of the parison is captured in the handle-forming area of the mold while the normally smaller diameter sections of the parison remain of less diameter than the mold, thus minimizing the amount of pinch-off material at the parting line of the body of the bottle.

Following the "pinching-off" operation, air is supplied through the line 58 and into the void 68 which comprises the major body-forming portion 59 of the parison portion 61, through the needle 56. Air within the volume 68 is free to pass into the voids 66 and 67 inside the respective handle-forming portions 62, 63, thereby expanding the handle-forming portions 62, 63 to fill the respective handle-forming cavities 52, 53, as the remainder of the parison portion 61 within the complete body cavity portion 51 is expanded by air pressure to fill the cavity 51, whereupon a bottle B is formed having a body portion 59 and handle portions 62, 63.

Concurrently with the handle "pinch-off," portions of the parison adjacent opposite ends of mold cavities are also "pinched-off" by mating surfaces of the mold.

In FIG. 8 there is illustrated another die core pin 71 of this invention adapted for cooperation with an extrusion die shell 72 for forming a tubular parison 73. The core pin 71 includes an inner tube 74 and an outer tube 75, similar to the core pin illustrated in FIG. 2. The outer tube 75 of the core pin 71 has a core portion 76 and a lip 77, defining a recess 78 therebetween. The die shell 72 includes a die 80 having a tubular forming bore 81 therein, in which is positioned the core pin 71. The bore 81 and core portion 76 cooperate to form the tubular parison 73.

The core pin lip 77 is at a terminal end of the core pin 71 and is of a greater diameter $D_1$ than the diameter $D_2$ of the core portion 76. It has been found that various plastic materials, such as polyethylene, when used in the extrusion process to form the extruded tubular parison 73, tend to "swell" or increase in diameter upon leaving the bore 81 of the extrusion die shell 72. Such a "swelling" may be particularly undesirable if the tubular parison 73 increases in diameter in such an amount that the inside surface of the parison 73 does not remain in contact with the annular lip 77 of the core pin 71, as the parison 73 passes over the lip 77. For this reason the core pin lip 77 may thus be of a greater diameter $D_1$ than the diameter $D_2$ of the core portion 76 in order to compensate for the "swelling" of the plastic material P as it is extruded from the die 72. A leading edge 79 of the lip 77 may be slightly rounded to streamline the flow of the parison 73 thereover.

In FIG. 9 there is illustrated an apparatus for forming a tubular parison 82 having a variably controlled wall thickness. This feature of the invention includes an extrusion die shell 83 having an outlet bore 84 and a die core pin 85 having outer and inner tubes 86 and 87, respectively. The outer tube 86 of the core pin 85 includes a conically shaped forming mandrel 88 and an annular core pin lip 90 spaced from the forming mandrel 88 and defining therebetween an annular recess 91. A sleeve 92 is engaged within the die shell 83 and receives the outer tube 86 of the core pin 85 therein, in sliding contacting relation. A sleeve end 93 adjacent the forming mandrel portion 88 of the core pin 85 is inwardly tapered to streamline the flow of the plastic P thereover. A suitable linkage member 94 engages the core pin 85 for longitudinal movement of the core pin 85 within the extrusion die shell 83. The outer surface of the conically shaped forming mandrel 88 cooperates with the outlet bore 84 of the extrusion die shell 83 to control the area of the passage defined by the core 84 and forming mandrel 88 and thereby controls the wall thickness of the parison formed by the passage of the extruded material through the opening defined by the bore 84 and mandrel portion 88. Thus the timing of the operation of the linkage member 94 in raising and lowering the core pin 85 and changing the opening between the die shell 83 and core pin 85 results in controlled variations in the cross-section of the extrudate, in timed relation with the variable diameter extrusion process. Mechanisms such as those described in commonly assigned Pat. No. 3,283,363 in the name of Howard M. Turner issued Nov. 8, 1966 may be utilized in controlling the timing of the variable cross-section extrusion process and variable diameter extrusion process described herein.

While air has been disclosed as the fluid responsible for the variable diameter extrusion, as well as the blow-molding operation, it is to be noted that any suitable fluid may be used within the spirit and scope of this invention.

Also, while the various operations disclosed herein have been presented as portions of an over-all continuous process, wherein the ballooning is accomplished in timed relation with the movement of the mold halves, it is to be noted that such an operation may be readily adapted to a discontinuous extrusion blow-molding process, comprising various "steps" or processes.

It is also to be noted that the size and shape of the "ballooned" parison portion may be varied by other factors not specifically discussed herein, as by the volume and speed of application of pressure, and that various geometrical considerations can be made to effect the shape and size of the "ballooned" parison portion as by varying the length of the core pin and the location and length of the core pin lip.

Although only preferred embodiments of the invention have been described and illustrated herein, it is to be understood that minor modifications may be made in the extrusion and blow-molding techniques of this invention within the spirit and scope of the invention, as defined in the appended claims.

I claim:

1. A method of extruding plastic tubing having controlled variations in diameter including the steps of extruding a tubular parison beyond an extruder and over an extended core, applying a relatively low pressure fluid inwardly of a parison portion beyond said extended core, applying a variable fluid pressure inwardly of that portion of the parison between the extruder and the extended core in amounts sufficient to change the diameter of portions of the parison, and positioning the ballooned parison portion between mating split mold portions and closing the split mold portions.

2. The method of claim 1 including the step of applying pressurized fluid interiorly of said ballooned parison to conform the parison to the configuration of the mold interior.

3. The method of making a blow-molded article having a major tubular body portion and at least one integral hollow tubular auxiliary portion; at least one end of the auxiliary portion being attached to said body portion with both of said portions defining volumes in communication with each other, said tubular auxiliary portion being separated from said tubular body portion intermediate its ends, comprising the steps of extruding a tubular parison, altering the diameter of a first portion of the parison by the application of differential pressure fluid inside the parison, inserting the parison between opposed split mold portions, closing the split mold portions to pinch-off from the first portion that portion of the parison between the parison auxiliary portion and parison body portion, applying fluid pressure to said parison auxiliary and body portions to expand said auxiliary tubular parison portion outwardly into contact with the mold and to conform auxiliary and body forming parison portions to their respective mold cavity portions.

4. The method of claim 3 wherein said inserting step includes aligning parison portions of different diameters with corresponding predetermined mold cavity pinch-off portions.

5. The method of claim 3 wherein the altering step comprises varying the fluid pressure inside the first parison portion to increase the diameter of that portion.

6. The method of claim 5 including the step of maintaining at a constant low interior pressure remaining portions of the parison which are not increased in diameter during the altering step.

7. The method of claim 5 wherein said parison body portion comprises a bottle-forming portion and wherein there are two auxiliary parison portions which comprise handle-forming portions secured to the bottle-forming portion at both ends thereof.

8. A method of extruding plastic tubing having controlled variations in diameter including the steps of extruding a tubular parison of a predetermined peripheral dimension beyond an extruder over an extended core and beyond a terminal end thereof, applying a relatively low pressure fluid internally of a first parison portion located beyond the core terminal end to maintain the first parison portion at approximately said predetermined peripheral dimension, and applying a different fluid pressure internally of another portion of the parison between the extruded and the core terminal end sufficient to change said predetermined peripheral dimension of the another parison portion to another substantially different peripheral dimension.

9. The method of extruding a plastic tubing as defined in claim 8 including the step of forming a seal between the first and another parison portions to maintain the first parison portion at approximately said predetermined peeripheral dimension, and breaking the seal after the different peripheral dimension has been established.

10. The method of extruding a plastic tubing as defined in claim 8 including the steps of positioning the another parison portion between mating split mold portions and closing the split mold portions.

11. The method of extruding a plastic tubing as defined in claim 9 including the steps of positioning the another parison portion between mating split mold portions and closing the split mold portions such as to seal diametrical opposite sides of said another parison portion.

12. The method of extruding plastic tubing as defined in claim 8 wherein the differing fluid pressure is greater than said relatively low pressure to balloon another said parison portion such that said different peripheral dimension is substantially greater than said predetermined peripheral dimension.

13. The method of extruding plastic tubing as defined in claim 12 including the steps of positioning the another parison portion between mating split mold portions and causing the split mold portions to contact diametrical opposite sides of said another parison portion.

14. The method of extruding plastic tubing as defined in claim 12 including the step of mechanically varying the wall thickness of the parison as it is extruded.

15. The method of extruding plastic tubing as defined in claim 12 including the step of forming a seal between the first and another parison portions to maintain the first parison portion at approximately said predetermined peripheral dimension, and breaking the seal after the different peripheral dimension has been established.

16. The method of extruding plastic tubing as defined in claim 15 including the steps of positioning the another parison portion between mating split mold portions and causing the split mold portions to contact diametrical opposite sides of said another parison portion.

17. Apparatus for extruding a plastic parison and blow-molding articles from the parison comprising an extruding means, variable fluid pressure means for changing the configuration of a first portion of the parison, fluid pressure means for retaining the shape of a second portion of the parison, said extruding means includes an extrusion die shell having an outlet with a core disposed partially therein, and partially extended outwardly of the shell; core lip means for sealingly engaging the interior of said parison at a position removed from said die shell; said fluid pressure means including means for distributing low pressure fluid inwardly of said parison beyond the core lip means; said variable fluid pressure means including means for distributing variable fluid pressure inwardly of said first parison portion and outwardly of the adjacent core portion.

18. The apparatus of claim 17 including a split blow-molding cavity having pinched-off mold means for defining integral handle-forming voids transversely of the parison.

19. The apparatus of claim 17 wherein the configuration of the core lip means controls the degree of contact between the inner surface of the parison and the core lip.

20. The apparatus of claim 17 wherein the core lip is of a greater diameter than a parison formative portion of the core.

21. The apparatus of claim 17 wherein said distributing means includes concentric tubes comprising said core.

22. The apparatus of claim 21 wherein the inner concentric tube defines means for distributing the low pressure fluid and the outer concentric tube defines means for distributing the variable pressure fluid; and wherein radially transverse fluid passage ports are adapted to transmit variable pressure fluid from said outer concentric tube to an annular recess disposed in the outer surface of said core.

23. The apparatus of claim 17 including means for varying the wall thickness of the initially formed parison.

24. The apparatus of claim 23 wherein said varying means includes a longitudinally movable core pin.

References Cited

UNITED STATES PATENTS

| | | | |
|---|---|---|---|
| 2,966,700 | 1/1961 | Dyer et al. | 264—95 |
| 3,012,286 | 12/1961 | Gasmire | 264—97 |
| 3,019,481 | 2/1962 | Negoro | 264(non uniform wall thickness) |
| 3,277,223 | 10/1966 | Curto | 264—97 |

ROBERT F. WHITE, Primary Examiner

T. J. CARVIS, Assistant Examiner

U.S. Cl. X.R.

18—5, 14; 264—98, 209